United States Patent
Roberts et al.

[11] Patent Number: 5,673,481
[45] Date of Patent: Oct. 7, 1997

[54] AIR GRID FOR UNDERDRAINS AND SIMILAR SYSTEMS

[75] Inventors: R. Lee Roberts, Boothwyn; Douglas H. Eden, Wallingford, both of Pa.; Andrew S. Taylor, Atlanta, Ga.

[73] Assignee: RF Delaware, Inc., Wilmington, Del.

[21] Appl. No.: 630,136

[22] Filed: Apr. 10, 1996

Related U.S. Application Data

[62] Division of Ser. No. 223,236, Apr. 5, 1994, Pat. No. 5,534,202.

[51] Int. Cl.[6] .................................................. B01D 24/46
[52] U.S. Cl. .................... 29/890.14; 210/795; 210/274
[58] Field of Search ........................... 261/124, 122.1, 261/DIG. 47; 285/150, 192; 210/274, 794, 795; 29/890.14

[56] References Cited

U.S. PATENT DOCUMENTS

| | | | |
|---|---|---|---|
| 593,666 | 11/1897 | Jewell . | |
| 650,671 | 5/1900 | Deutsch . | |
| 668,344 | 2/1901 | Wilson . | |
| 1,096,868 | 5/1914 | Stevenson . | |
| 1,114,763 | 10/1914 | Hodkinson . | |
| 1,998,279 | 3/1935 | Hungerford | 210/130 |
| 2,318,728 | 5/1943 | Werking | 261/122.1 |
| 2,548,788 | 4/1951 | Helme | 285/150 |
| 3,347,537 | 10/1967 | Morgan | 261/124 |
| 3,424,443 | 1/1969 | Thayer | 261/124 |
| 3,441,216 | 4/1969 | Good | 261/122.1 |
| 3,468,422 | 9/1969 | Camp | 210/274 |
| 3,719,591 | 3/1973 | Crits | 210/33 |
| 3,785,629 | 1/1974 | McKinney | 261/122.1 |
| 3,817,378 | 6/1974 | Ross | 210/80 |
| 3,840,117 | 10/1974 | Ross | 210/80 |
| 3,841,997 | 10/1974 | McGee | 261/122.1 |
| 3,953,553 | 4/1976 | Thayer | 261/122.1 |
| 3,956,134 | 5/1976 | Sturgill | 210/275 |
| 3,968,034 | 7/1976 | Tymoszczuk | 210/8 |
| 4,032,443 | 6/1977 | Ross | 210/82 |
| 4,178,239 | 12/1979 | Lowther | 210/15 |
| 4,218,318 | 8/1980 | Niimi et al. | 210/150 |
| 4,273,732 | 6/1981 | Roediger | 261/47 |
| 4,364,830 | 12/1982 | Roberts | 210/268 |
| 4,460,467 | 7/1984 | Ueda | 210/276 |
| 4,537,687 | 8/1985 | Piper | 210/793 |
| 4,579,659 | 4/1986 | Eades et al. | 210/541 |
| 4,581,143 | 4/1986 | Pepper, III | 210/614 |
| 4,619,765 | 10/1986 | Roberts . | |
| 4,657,673 | 4/1987 | Kessler | 210/108 |
| 4,673,507 | 6/1987 | Brown | 210/681 |
| 4,693,831 | 9/1987 | Garzonetti | 210/744 |
| 4,960,546 | 10/1990 | Tharp | 261/122.1 |
| 5,019,259 | 5/1991 | Hambley | 210/274 |
| 5,032,294 | 7/1991 | Schulz | 210/795 |
| 5,080,808 | 1/1992 | Kim et al. | 210/792 |
| 5,089,147 | 2/1992 | Ross | 210/793 |
| 5,127,582 | 7/1992 | Roberts | 239/553.3 |
| 5,156,738 | 10/1992 | Maxson | 210/274 |
| 5,160,613 | 11/1992 | Walter | 210/274 |
| 5,167,840 | 12/1992 | Jaccarino | 210/794 |
| 5,176,827 | 1/1993 | Walter | 210/274 |
| 5,198,124 | 3/1993 | Kim et al. | 210/792 |
| 5,413,710 | 5/1995 | Roberts et al. | 210/274 |

FOREIGN PATENT DOCUMENTS

| | | |
|---|---|---|
| 554877 | 6/1923 | France . |
| 541291 | 3/1956 | Italy . |

*Primary Examiner*—Tim R. Miles
*Attorney, Agent, or Firm*—Woodcock Washburn Kurtz Mackiewicz & Norris LLP

[57] ABSTRACT

Air grid systems for distributing a gas within treatment systems such as underdrain filters and contact clarifiers is disclosed. The air grid is supported from above so that it can be lowered into position and thus modified or repaired. Additionally, this feature permits retrofitting an air grid into an existing system, such as an underdrain filter, in which the bed of media overlies the underdrain is not upset by the installation. Thus, methods of installing or retrofitting air grid systems are also disclosed. In another aspect of the present invention, the air grid is comprised of an air manifold connected to air laterals by a spreader conduit that is inserted through a smooth bore in the walls of the manifold, thereby providing a simple and easy to manufacture structure that avoids problems found in prior art components.

4 Claims, 4 Drawing Sheets

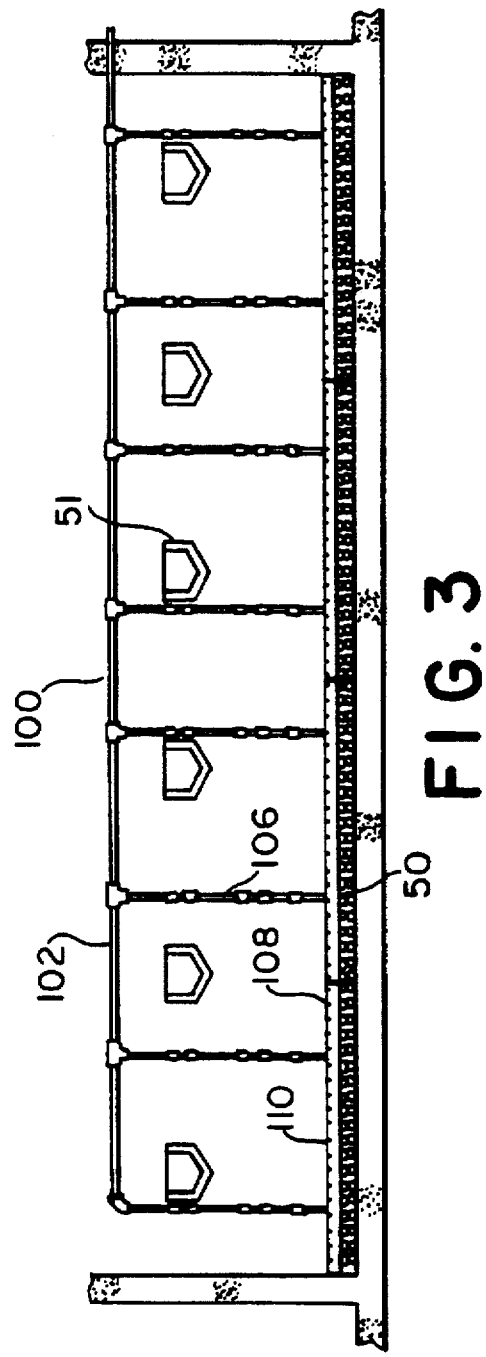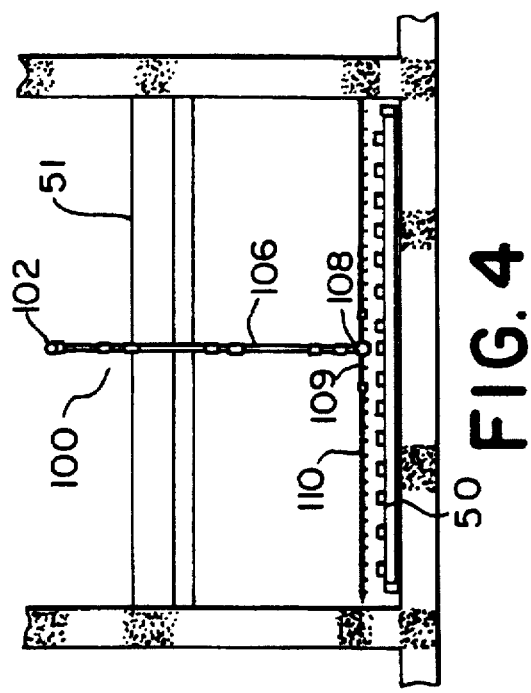

AIR GRID FOR UNDERDRAINS AND SIMILAR SYSTEMS

This is a division of application Ser. No. 08/223,236, filed Apr. 5, 1994, now U.S. Pat. No. 5,534,202, the disclosure of which is herein incorporated by reference.

The present invention relates to the treatment and/or filtering of liquids, in particular wastewater. More specifically, the present invention relates to underdrains and similar structures, and discloses improvements in methods and apparatus for providing air scouring of the filter media used in such systems.

BACKGROUND OF THE INVENTION

Filters and the like that use a bed of filter media to remove solids from liquids are well known. Such systems typically include a liquid distribution system that collects liquid after it is filtered in one flow direction and distributes clean liquid in a reverse flow direction through the filter media to effect a cleaning process known as backwashing. The backwashing process may simultaneously or alternately introduce air or another gas through the media to enhance the cleansing effect, known in the art as "air scouring." For example, U.S. Pat. No. 593,666—Jewell discloses a filter system that uses central manifold and a series of laterally extending branch pipes to distribute backwash air through strainers. The air manifold and laterals are separate and the air manifold is disposed within the central manifold and laterals that carry liquid, except that the strainers are not directly connected to the orifices in the air laterals. U.S. Pat. No. 668,344—Wilson, discloses an underdrain structure that combines separate channels to carry backwash liquid and backwash air, the air and water laterals are arranged in alternating fashion in a single plane along the bottom of the filter bed. The water main, however, enters at the bottom of the bed while the air main enters at the top of the bed and is split into two sections that extend downwardly to the bottom of the filter bed. The section of the air main disposed at the bottom of the filter contains the air laterals. U.S. Pat. No. 1,988,279—Hungerford discloses an air grid that rests on supports extending from the bottom of a filter structure such that the air grid is disposed above the underdrain/water grid piping and is located at the interface between a gravel layer and a layer of filter media, the Hungerford patent explains that if the air grid is disposed below the gravel, the gravel layer is disturbed during air scouring and the filter will fail in subsequent operation. On the other hand, if the gravel layer is omitted, the fine filter media will clog the orifices in the underdrain. The relatively smaller orifices in the air grid are not clogged if they are of a diameter smaller than the diameter of the fine media particles.

In addition to grids comprised of pipe, fluid transport systems for underdrain filters are known that comprise a series of underdrain blocks that connect to create internal fluid conduits. Layers of gravel and/or filter media are laid atop the underdrain blocks to complete the filter system. U.S. Pat. No. 3,468,422—Camp discloses such an underdrain and uses interconnected ceramic blocks that create an internal conduit for distributing both liquid and air, the latter being supplied into each block by individual pipes connected to an air header disposed beneath the bottom of the blocks. U.S. Pat. No. 3,817,378—Ross discloses a filter system wherein air is introduced into underdrain blocks using a separate air grid comprised of an air header and air laterals disposed beneath the blocks, and also uses a sperate air grid disposed atop a layer of fine filter media to agitate effluent.

Additionally, U.S. Pat. No. 5,019,259—Hambley discloses a filter underdrain formed from sheet metal that provides conduits for both backwash liquid and backwash air. The Hambley patent explains that structures and methods relating to underdrain and backwash systems are useful not only in filter systems, but also in other types of systems such as upflow and downflow contact clarifiers and filters, activated carbon contactors, ion exchange units, iron removal units, catalyst bed contactors and neutralizing media contactors. Thus, it is known in the art that the term "underdrain" is to be interpreted broadly, and as used herein, is to be interpreted to encompass all such systems and similar systems wherein it is useful to provide an air grid for distributing a flow of air or other gas across a surface. For example, U.S. Pat. No. 5,167,840—Jaccarino discloses a clarifier that combines upflow and downflow filter media. An air grid is located at the bottom of the upflow filter bed, but is similar in construction to the backwash air grids disclosed in the prior art systems discussed above, that is, the air grid comprises an air conduit and a series of perforate air laterals mounted to a structure beneath liquid carrying conduits disposed beneath the filter media.

Certain prior art filters, clarifiers and similar systems did not include an air grid for air scouring or similar operations. It would be desirable to include such a feature, since backwash operations and ultimately the performance of the filter or other system would be enhanced. It is therefore an object of the present invention to provide methods and apparatus whereby and air grid can be retrofitted into an existing system. Additionally, whether for a retrofit or a new system, previous designs suffered from drawbacks associated with integrating the backwash air conduits within or integral with the liquid conduits. In many systems structures that are not level or where equipment has been inaccurately specified or constructed, among other things, it is often difficult, if not impossible, to achieve efficient operation. The need to flow liquid in two directions and a also flow gas in one of the directions, with even distribution of all fluids in all directions and through essentially the same structure severely limits the ability of the construction team to modify the liquid and gas distribution systems. Thus, it would be desirable to provide a system wherein the liquid and gas flow through different conduits in different structures so that lengths and diameters can be altered and/or baffles, reducers, restrictions or other modifications can be readily made to one system without structural alteration of the other. It is therefore an additional object of the present invention to provide a modular air grid system that may be readily used with a wide variety of filters and other fluid handling systems. Thus, a further objective of the present invention is that an air grid, whether new or a retrofit, can be inserted into a system, activated and evaluated, and changed if necessary. Achieving this goal would permit he "trial and error" solutions often necessary in actual applications without undue expense or burden. Additionally, certain existing air headers use a nipple to connect a "tee" fitting to an air header; air laterals are connected to the remaining legs of the "tee." It would be desirable to simplify this connection and it is thus another object of the present invention to provide a structurally sound and simple connection that permits connection between a header and air laterals.

SUMMARY OF THE INVENTION

The present invention provides an air grid that is not attached to the lateral underdrain or any other portion of the bottom structure of a filter or other system, nor is the air distribution grid disposed within the underdrain laterals or any other conduits that carry either effluent or backwash liquid. The air distribution grids disclosed herein therefore provide air distribution in a simple, modular fashion that can be readily modified, even during construction, to provide efficient and effective air distribution within a system. Moreover, the modular nature and support from above permit the air grid of the present invention to retrofitted into existing fluid handling systems, such as municipal wastewater treatment systems that lack an air scour system. Finally, in the preferred embodiments disclosed herein, the air lateral construction is simplified to eliminate threaded connections and cast bosses, providing a simple and sound junction between the air laterals and the air supply pipes.

BRIEF DESCRIPTION OF THE DRAWINGS

FIG. 3 is a side elevation view of an air grid made in accordance with the present invention mounted in an underdrain filter;

FIG. 4 is an end view of the filter and air grid illustrated in FIG. 3; and

DETAILED DESCRIPTION OF THE PREFERRED EMBODIMENTS

Figure 1:
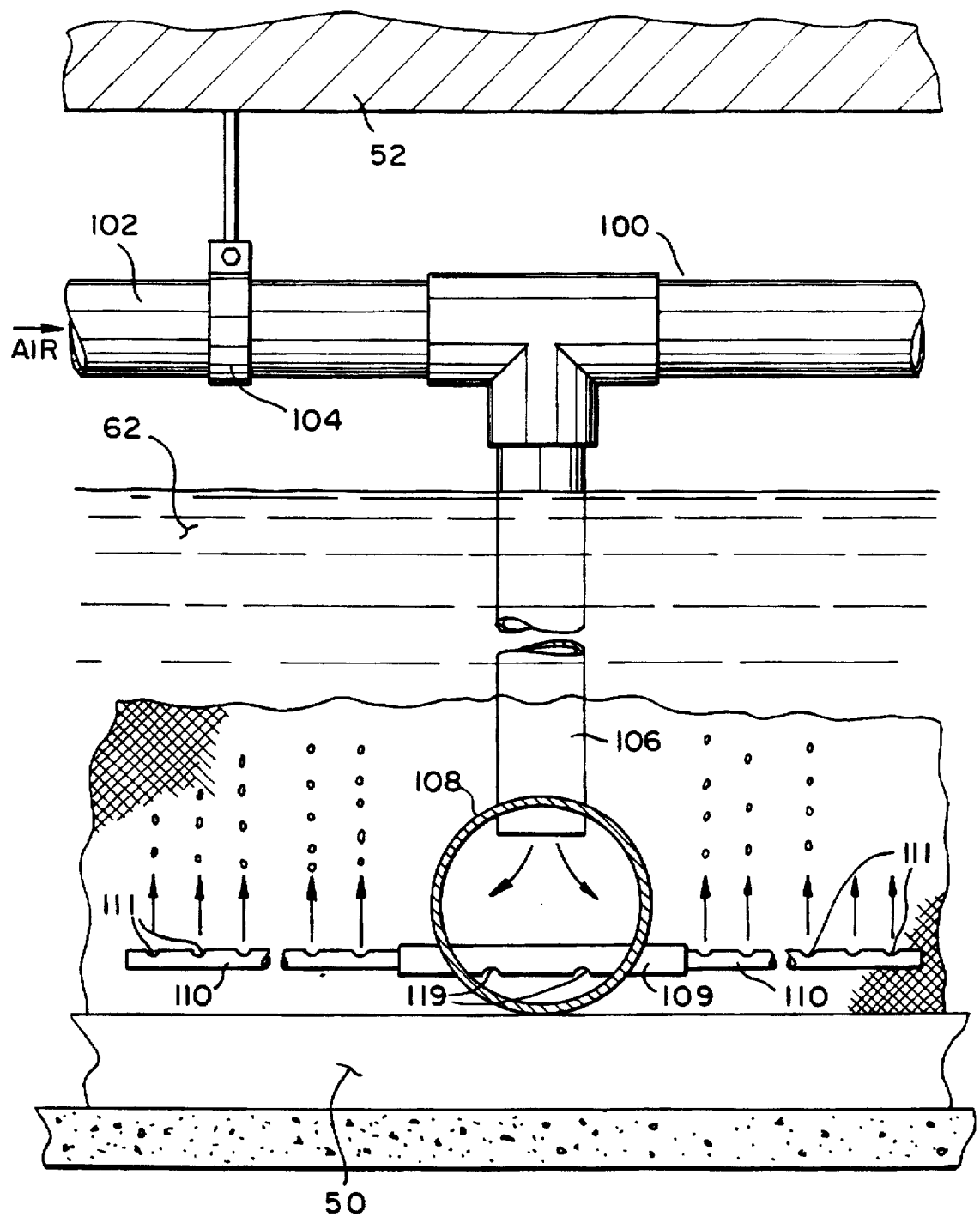
FIG. 1 is a side elevation view of an air grid and surrounding structures, partially broken away, that is made in accordance with the present invention.

Referring now to FIG. 1, there is illustrated a side elevation view of an air grid 100 made in accordance with the present invention. The term "air grid" as used herein includes any system of conduits, tubing or pipe that primarily carries air or any other gases. As will be understood by those of ordinary skill and in accordance with the prior art, an air grid can be mounted in any of a number of types of fluid handling systems and although typically used to effect air backwash or air scrubbing, the systems disclosed herein are neither limited to underdrain filters or air backwash applications. FIG. 1 illustrates a portion of the air grid 100 that is disposed atop another structure 50, typically an underdrain or other liquid handling system. It should be understood, however, that the air grid 100 may be disposed at any level that is desired, e.g., above a gravel layer or near the surface of a layer of effluent. Nonetheless, as seen in FIG. 1, one feature of the air grid of 100 of the present invention is that there is no connection between the bottom of the underdrain or other structure 50 and the air grid 100. As explained in further detail below, this is advantageous for several reasons. In accordance with the present invention, the support for the air grid 100 is provided from above. For example, an air supply header 102 can be attached to an upper surface or structure 52 using a simple pipe support and hanger 104 as illustrated. Alternatively, the air supply header 102 can rest on top of braces or portions of the structure and will not "hang" for a separate support component, as illustrated. One of the primary advantages of the present invention is that the anchoring hardware and supports for the air lateral system is provided from above by the center supply pipe 102, which is in turn supported by the structure of the filter 52 that lies above the level of the filter media, and is thus accessible and does not create space considerations wherein the structure of the air grid and its supports displace filter media and filtrate, reducing the effective amount of filtration that occurs within a give filter volume.

Depending downwardly from the air supply header 102 are one or more connecting tubes 106. As illustrated, the connecting tubes 106 may be part of a tee connection or can be threaded or otherwise inserted into the main air supply header 102. The connecting tubes 106 terminate within and provide air flow into one or more header pipes 108, from which air laterals 110 extend. The header pipe 108 is preferably up to about 10–12 feet long and is preferably about 3.0 inches in diameter.

FIG. 1 also illustrates the structure surrounding the air grid 100 described above. In the typical situation illustrated, a layer of filter media 60 overlies the underdrain or other structure 50 described above. A layer of liquid 62, e.g., effluent overlies the filter media 60 in the case of a downflow filter operating in a filtration mode. Thus, as illustrated and in accordance with conventional design, the air laterals 110 distribute streams of air through the filter media 60 via a series of orifices 111. In preferred embodiments, the air laterals 110 contain a series of perforations, holes, or slits 111.

In accordance with one aspect of the present invention, a spreader conduit 109 is preferably constructed by using a short section of tubing to pierce the walls of the header pipe 108 in a continuous fashion. This embodiment provides a structure that can be advantageously and readily constructed in a variety of sizes using conventional materials and techniques. In particular, no threaded bosses or threaded nipple connection is needed. As known to those of skill in the art, a threaded boss that is offset from the center of a cast pipe creates a stress concentration, inviting crack formation where the boss meets the outer wall of the pipe. Additionally, it also known that cutting threads in the curved side walls of a pipe is relatively difficult. Instead, this aspect of the present invention provides a structure that requires only a straight hole of appropriate diameter drilled through the air header pipe 108 and the spreader conduit 109 forced into the hole. Preferably, one or more orifices 119 are formed in the wall of the spreader conduit 109, to permit air to be evacuated from the air header pipe 108 and into the inside of the spreader conduit 109. In the embodiment illustrated the above-described air laterals 110 are attached at each end of the spreader conduit 109 to provide air distribution across the bed.

Figure 2:
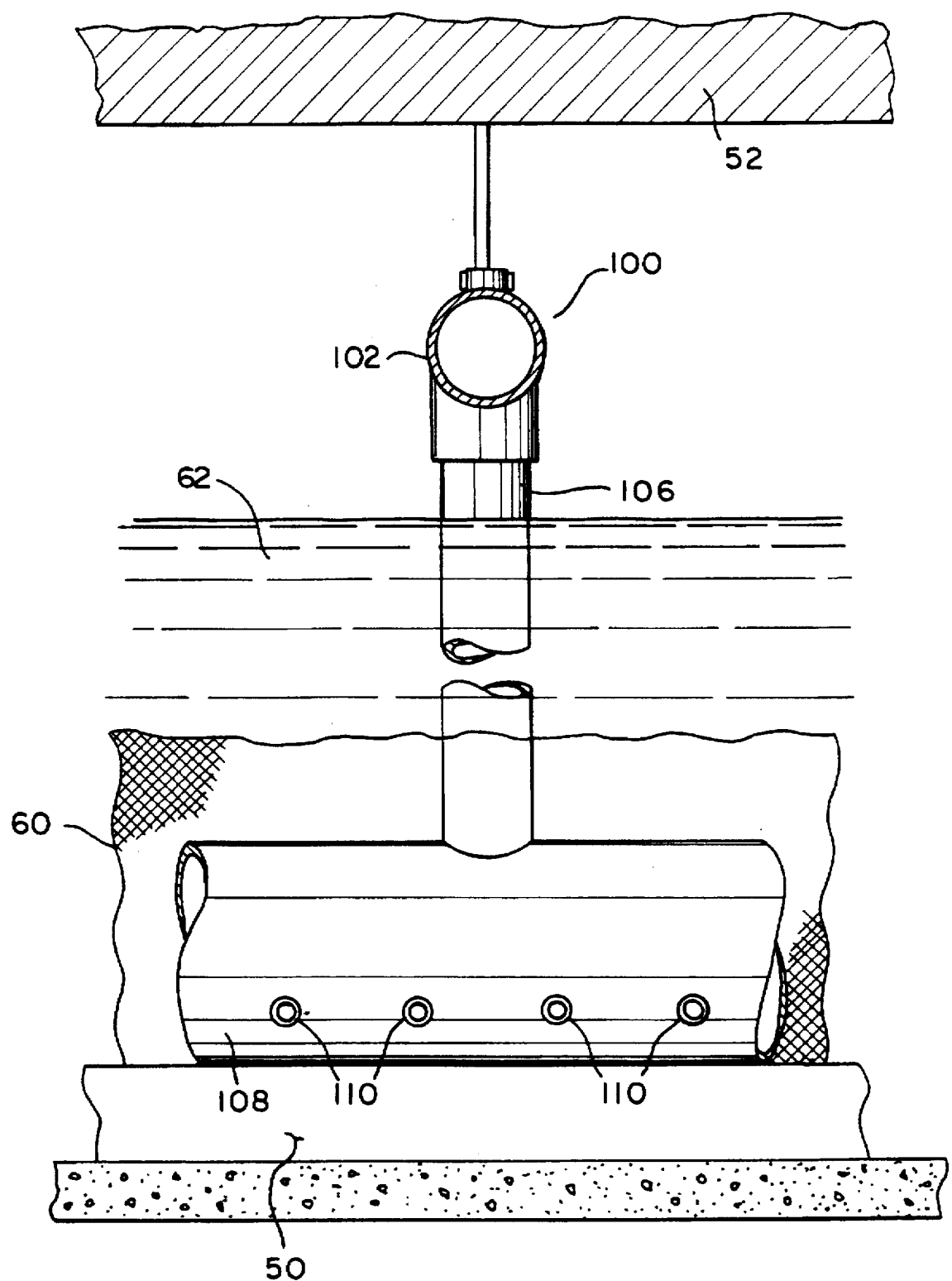
FIG. 2 is an end view of the system illustrated in FIG. 1.

FIG. 2 illustrates a side elevation view of the system illustrated in FIG. 1. In particular, this view illustrates that a plurality of air laterals are preferably arrayed along each header pipe 108, and the orientation of the various connecting elements with relation to one another.

Referring now to FIGS. 3–4, an installation of an air grid 100 in accordance with the present invention is shown in views similar to FIGS. 1–2. In these illustrations, however, the surrounding structure is not broken away and the full complement of piping and air laterals 110 can be seen. A review of FIGS. 4–5 illustrates how an air grid can be retrofitted into an existing system, even where certain obstructing structures such as troughs are present.

The present invention also provides improved methods of installing air grids in filter systems. The installations contemplated herein involve both the initial installation of an air grid in a filter system as well as the retrofit of an air grid into an existing filter system. In accordance with this aspect of the present invention, backwash liquid, e.g., water flows through he existing backwash conduits of the filter. The reverse flow of the backwash liquid must be at a pressure and flow rate sufficient to fluidize the filter media. When the filter media are fluidized, the air grid described above can be lowered ("sunk") through he media, to the bottom (or any intermediate level). Once the air grid is installed, the backwash liquid flow can be abated to stabilize the filter media and anchor the grid in place. Once in place, the grid can be supported as described above, so that subsequent backwash and air scour operations will not displace the air grid from its installed location.

Figure 5:
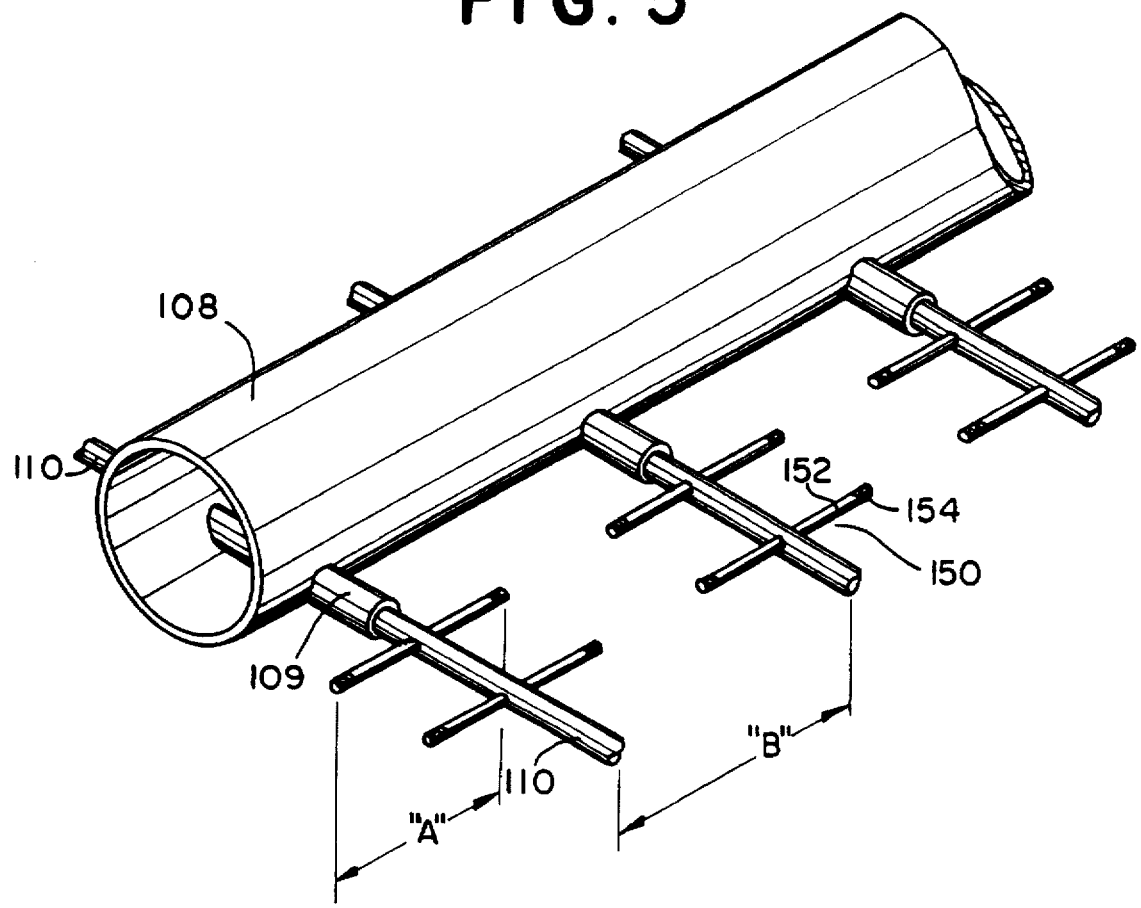
FIG. 5 is a perspective view of an additional embodiment of an air grid and surrounding structures.

In another aspect of the present invention, certain embodiments of the present invention can be constructed as shown in FIG. 5. In particular, these embodiments will be useful in installations such as contact clarifiers where there is little or no pressure or load due to the weight of the filter media. Referring to FIG. 5, an air grid substantially as shown in FIGS. 1–2 is illustrated. Air laterals 110 extend from spreader tubes 109 to distribute air from the air header pipe 108, as described above. However, in this embodiment, a plurality of air diffusion nozzles 150 are inserted through each air lateral 110 to further distribute the air. In this regard, the air diffusion nozzles 150 can be described as "sublaterals." As seen in FIG. 5, each air diffusion nozzle is preferably comprised of an air diffusion tube 152 capped by a screen 154 at each end. Most preferably, each air diffusion tube 152 is connected to the air lateral 110 in the same manner as the connection between the spreader tube 109 and the air header pipe 108. One further advantage of the lateral/sublateral system illustrated in FIG. 5 is that a specified air distribution can be achieved using less air laterals 110 because the air diffusion nozzles 150 can provide two points of air distribution adjacent each lateral 110. As a result, the desired spacing between points of air distribution ("A") is achieved even though the spacing between laterals 110 ("B") is up to twice as large as formerly necessary. In other words, the number of air laterals can be reduced by one-half. In a most preferred embodiment, the air header 108 is a 12 inch pipe, the air lateral 110 is a 2.0 inch diameter steel tube, and the air diffusion tube 152 is comprised of 7/16 inch diameter plastic tubing such as high density polyethylene, with stainless steel mesh end caps 154 that pierce the wall of the air laterals at spaced-apart intervals. The air diffusion tube 152 may also be comprised of stainless steel.

Although certain embodiments of the present invention have been described herein with a great degree of particularity, these descriptions are for the purpose of illustrating the invention and are not meant to provide limitations. Numerous adaptations, modifications and variations will present themselves to those of skill in the art upon review of the foregoing specification that will not depart form the spirit of the present invention. Accordingly, reference should be made to the appended claims in order to determine the full scope of the present invention.

What is claimed:

1. A method of installing an air grid in a fluid flow apparatus containing a liquid conduit and filter media comprising the steps of:
    forcing liquid through filter media via a liquid conduit to create a fluidized bed;
    lowering an unattached air grid from the top of the filter media to a location beneath the top of the filter media;
    reducing the flow of liquid in the liquid conduit wherein the bed is no longer fluidized; and
    anchoring the air grid to a structure disposed above the top of the filter media.

2. The method of claim 1 wherein the air grid is retrofitted into an existing fluid flow apparatus.

3. A method of installing an air grid in a lateral underdrain apparatus containing a liquid conduit and filter media comprising the steps of:
    forcing backwash liquid through a backwash conduit and through filter media to create a fluidized bed;
    lowering an unattached air grid from the top of the filter media to a location beneath the top of the filter media;
    reducing the flow of liquid wherein the bed is no longer fluidized; and
    anchoring the air grid to a structure disposed above the top of the filter media.

4. The method of claim 3 wherein the air grid is retrofitted into an existing lateral underdrain.

* * * * *